(12) United States Patent
Reissman et al.

(10) Patent No.: US 7,519,953 B2
(45) Date of Patent: Apr. 14, 2009

(54) METHOD AND SYSTEM FOR AUTOMATICALLY TESTING A SOFTWARE BUILD

(75) Inventors: Pierre-Jean Reissman, Bellevue, WA (US); Jacqueline L. Reid, Carnation, WA (US); Paul Midgen, Bellevue, WA (US); Viresh Ramdatmisier, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 674 days.

(21) Appl. No.: 10/677,129

(22) Filed: Sep. 30, 2003

(65) Prior Publication Data

US 2005/0071818 A1 Mar. 31, 2005

(51) Int. Cl.
G06F 9/44 (2006.01)
G06F 7/00 (2006.01)
G06F 11/00 (2006.01)

(52) U.S. Cl. .................. 717/124; 717/170; 707/102; 714/38

(58) Field of Classification Search .................. 717/127
See application file for complete search history.

(56) References Cited

U.S. PATENT DOCUMENTS

| | | | |
|---|---|---|---|
| 6,282,698 B1* | 8/2001 | Baker et al. | 717/118 |
| 6,742,178 B1* | 5/2004 | Berry et al. | 717/130 |
| 6,748,584 B1* | 6/2004 | Witchel et al. | 717/136 |
| 6,918,106 B1* | 7/2005 | Burridge et al. | 717/100 |
| 6,925,638 B1* | 8/2005 | Koved et al. | 717/155 |
| 6,968,540 B2* | 11/2005 | Beck et al. | 717/130 |
| 6,978,401 B2* | 12/2005 | Avvari et al. | 714/38 |
| 7,165,074 B2* | 1/2007 | Avvari et al. | 707/102 |
| 2004/0031015 A1* | 2/2004 | Ben-Romdhane et al. | 717/107 |
| 2005/0028143 A1* | 2/2005 | Aridor et al. | 717/122 |

* cited by examiner

*Primary Examiner*—Tuan Q Dam
*Assistant Examiner*—Thuy Dao
(74) *Attorney, Agent, or Firm*—Workman Nydegger

(57) ABSTRACT

Testing of a software build. Differences between software builds are tracked by scanning the binaries of a software product to automatically discover its classes. A detailed dictionary is built that captures static and dynamic information of that build, including class dependencies. A comparison may be made with another build, so that selective tests may be automatically executed on any types, and their dependencies, that have had a structural or behavioral modification since the last build. Testers may load a set of constructors for any specific types to further increase coverage of types (or classes) tested. Detailed reports may also be provided that may be used to drive future testing work and target specific areas of the code for additional testing. Code generation from intermediate code to specified targets may also be performed to aid in reproducing and fixing bugs.

11 Claims, 17 Drawing Sheets

```xml
1102 — <SmokeTest date="9/26/2003 6:14:48 PM">
1104 —   <Assembly name="TFactory.dll">
1106 —     <Class name="Class1" namespace="TFactory">
1108 —       <constructor name=".ctor" public="True" static="False" param="">
1110 —         <param val="" />
1112 —         <ret value="TFactory.Class1" />
           </constructor>
         - <method name="dosomething1" public="True" static="False" returns="System.Void"
             param="">
             <param val="" />
             <ret value="null" mode="oject nullParam" />
1114 —     <method name="getInstance" public="True" static="True" returns="System.Object"
             param="System.String type,">
1116 —         <param val="(System.String 'null')" />
1118 —         <ret value="null" mode="static nullParam" />
1120 —         <param val="(System.String '»Âñ·tYôUU2açQÇ@xë%[KëE9%ZM/
             ÿ4óuÁÒ2yvHm{ÊÁñÐòib-T0zjuy·RDGÁYòüiã*1?1imGõeOü(G8Fß°XJkew!\ü·Â]Ú6IgãÕuQ')" />
1122 —         <ret value="null" mode="static param" />
           </method>
         </Class>
       </Assembly>
     </SmokeTest>
```

FIG. 11

```
1202  <SmokeTest date="9/26/2003 6:14:48 PM">
1204    <Assembly name="TFactory.dll">
1206      <Class name="Class1" namespace="TFactory">
1208        <method name="dosomething1" public="True" static="False" returns="System.Void" param="">
1210          <param val="" />
1212          <ret value="null" mode="oject nullParam" />
```

FIG. 12

| All Components | Blocks | Arcs | Functions | Source Files | Classes |
|---|---|---|---|---|---|
| Total | 6411 | 7100 | 796 | 42 | 58 |
| Hit | 2907 | 2612 | 713 | 40 | 53 |
| Percentage (%) | 45% | 37% | 90% | 95% | 91% |

| System.messaging.dll | Blocks | Arcs | Functions | Source Files | Classes |
|---|---|---|---|---|---|
| Total | 6411 | 7100 | 796 | 42 | 58 |
| Hit | 2907 | 2612 | 713 | 40 | 53 |
| Percentage (%) | 45% | 37% | 90% | 95% | 91% |

Code Coverage Report
1602

FIG. 16

METHOD AND SYSTEM FOR AUTOMATICALLY TESTING A SOFTWARE BUILD

FIELD OF THE INVENTION

The invention relates generally to computer systems, and more particularly to an improved method and system for automatically testing a software build.

BACKGROUND OF THE INVENTION

Software development usually requires testers to evaluate the quality of a software product in many ways including its requirements, specifications, user interface, and design. In the case of a platform product that is used by other programmers for creating software products, application program interfaces (APIs) also need to be evaluated as thoroughly as possible. One of the challenges in testing APIs is to perform a variety of tests to evaluate the quality of the product before shipping it. For example, one fundamental test is to verify that the parameters which may be passed in the invocation of an API are of the appropriate type and value. Another test may be a high-level test to verify that the invoked API behaves as intended. To perform this verification, the API may be included in an application such as a mail form, line of business application or the like so that its functionality may be evaluated.

It is not unusual for testers with a limited amount of time to attempt to use high-level testing, such as calling an API to perform a specific task, as a substitute for some fundamental testing like parameter testing. Although some level of parameter testing occurs during such scenario-type testing, it is difficult to quantify the level of coverage achieved by such testing. Each and every API should ideally be passed a varied set of values as parameters in order to achieve broad coverage in performing parameter validation testing. Historically, it has been difficult to achieve such coverage beyond the norm of about 60% of APIs tested for large platform products.

Testers are additionally challenged by the very nature of building a platform product. The platform product changes constantly as features and functionality are added and modified, sometimes in response to usability testing and customer feedback. Tests consequently break on a rather frequent basis whenever new APIs are introduced to the platform or existing APIs are changed or removed.

What is needed is a test environment that is capable of tracking code changes made during the development of a software product as the changes occur so that testers may better understand what tests may need to be changed for evaluating the quality of the current state of the product. Furthermore, this test environment should provide the capability for broad coverage in testing APIs and a way to quantify the level of such testing achieved for APIs.

SUMMARY OF THE INVENTION

Briefly, the present invention provides an improved system and method for automatically testing a software build. To this end, the present invention automatically tracks differences between software builds by scanning the binaries of a software product to automatically discover what may be over a thousand classes in that particular build of the product. The present invention then builds a detailed dictionary that captures static and dynamic information of that build, including class dependencies. A comparison may be made with another build, so that the present invention may automatically execute selective tests on any types, and their dependencies, that have had a structural or behavioral modification since the last build.

The system and method provides a graphical user interface and editors so that testers may create and load a set of validators for any specific types to further increase coverage of types (or classes) tested. Such validators may be used to attach a validation pattern to a specific type that may include a validator implementation for dynamically implementing testing of the type, a constructor factory for creating instances of the type under test and instances of the types that need to be passed as parameters, a matrix generator for providing different combinations of parameter values for input as test vectors, and a comparator for verifying that the actual output is the expected output. Instances of the class may then be created using the dedicated constructors during invocation of the methods. Furthermore, fault injection may be used to alter a method so that the method may execute a branch in an execution path not usually covered by regular testing.

The present invention may advantageously provide detailed reports. Each time a build is scanned, the system may provide a report that lists differences tracked between a previously scanned software build. The report may indicate any new, changed, or deleted element or result. Additionally, the system may provide a report presenting information on how many classes were tested, including the number of blocks within a class that were executed and the number of arcs followed in the execution path. This report may be used to drive future testing work and target areas of the code for additional testing. Furthermore, the present invention also provides code generation from intermediate code to specified targets to aid in reproducing and fixing bugs. This may also be useful for a developer who wishes to compile, debug and test the code.

In general, the system and method is fairly comprehensive as well as flexible and extensible for testing any software product. Other advantages will become apparent from the following detailed description when taken in conjunction with the drawings, in which:

BRIEF DESCRIPTION OF THE DRAWINGS

FIG. 11 is an illustration generally representing an example of a dictionary, in accordance with an aspect of the present invention;

FIG. 12 is an illustration generally representing an example of a result after invoking a method of a type in the dictionary, in accordance with an aspect of the present invention;

FIG. 16 is an illustration generally representing an example code coverage report.

DETAILED DESCRIPTION

Exemplary Operating Environment

Figure 1:
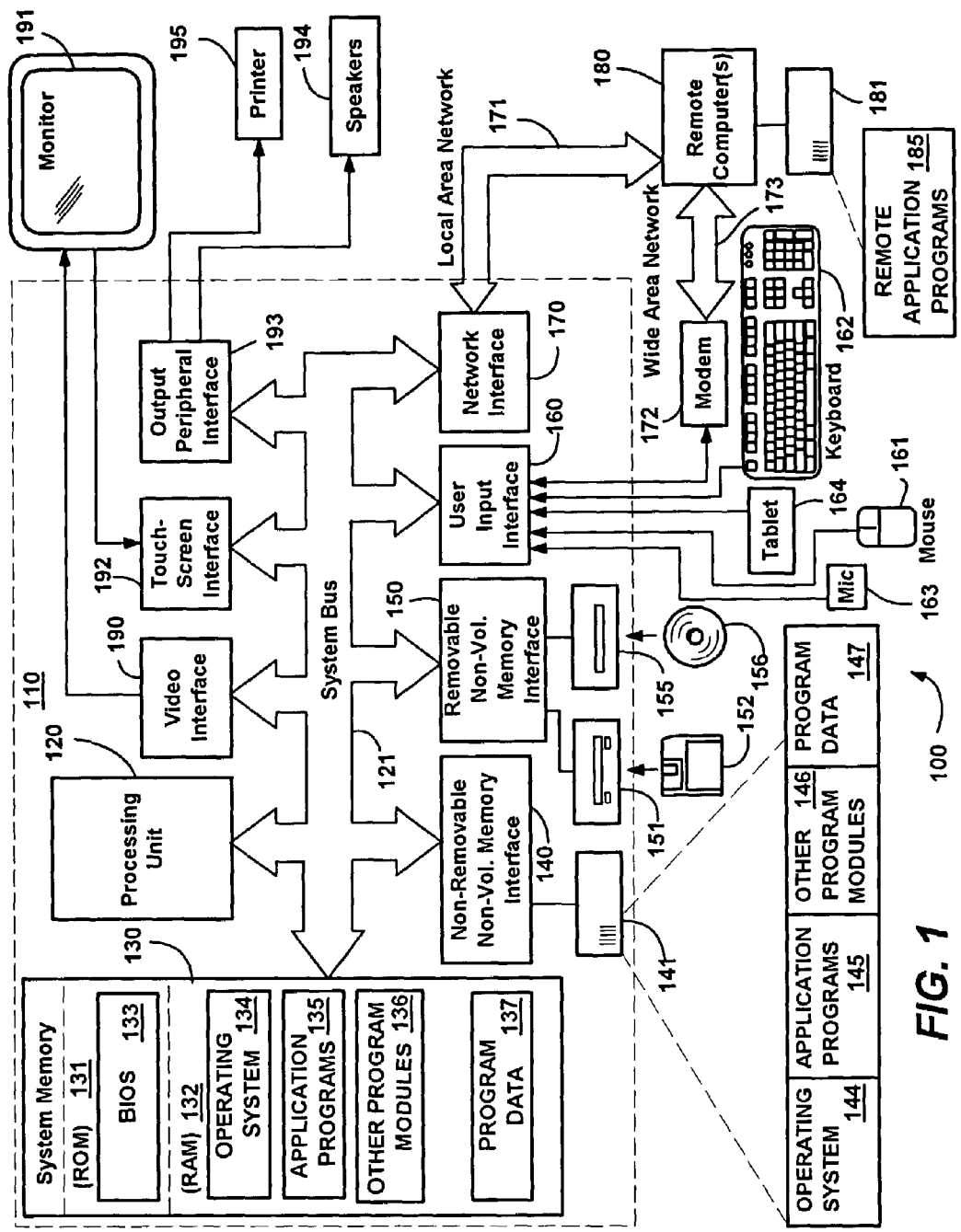
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Automatically Testing a Software Build

The present invention is generally directed towards an improved system and method for automatically testing a software build. To this end, the present invention automatically tracks differences between software builds by scanning the binaries of a software product to automatically discover what may be over a thousand classes in that particular build of the product. The present invention then builds a detailed dictionary that captures static and dynamic information of that build, including class dependencies. A comparison may be made with another build, so that the present invention may automatically execute selective tests on any types, and their dependencies, that have had a structural or behavioral modification since the last build. The present invention may also provide detailed reports that may be used to drive future testing work and target specific areas of the code for additional testing. A graphical user interface and editors may be used by testers to create and load a set of constructors for any specific types to further increase coverage of types (or classes) tested. The present invention may further provide code generation from intermediate code to specified targets to aid in reproducing and fixing bugs. As will be understood, the various block diagrams, flowcharts, illustrations and scenarios described herein are only examples, and there are many other scenarios to which the present invention will apply.

Figure 2:
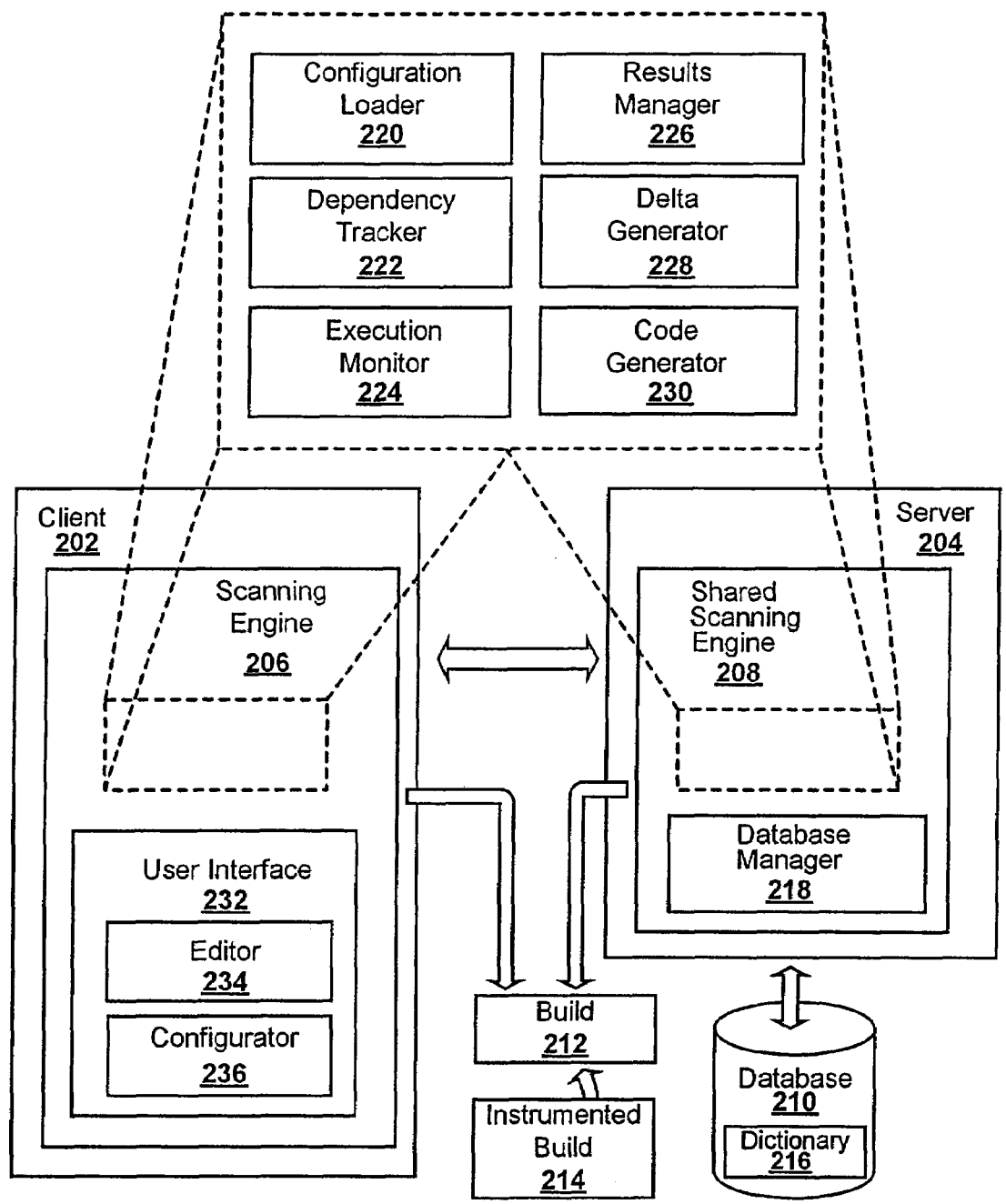
FIG. 2 is a block diagram generally representing a client-server architecture for automatically testing a software build, in accordance with an aspect of the present invention.

Turning to FIG. 2 of the drawings, there is shown a client-server architecture for automatically testing a software build. The client 202 may be computer system 110 of FIG. 1 operably coupled to a server 204, such as remote computer 180 of FIG. 1, using a logical connection like a local area network (LAN) 171, a wide area network (WAN) 173, or other type of network. The server 204 may execute a scanning engine 208 that may be shared by any number of testers who want to access the system from a client 202 computer. The scanning engine 208 may be any kind of executable code such as an application program, a kernel component, a system library or other type of executable. The scanning engine 208 scans a build 212 which may be a set of binary files compiled from the source code of a product. There may also be an instrumented build 214 available which contains embedded instructions in the binary files for tracing the execution path of the code. The scanning engine 208 may also scan such an instrumented build 214 so that the execution path of the code may be available for analyzing code coverage of tests. Either type of build may come from any variety of development systems capable of compiling source code into intermediate code, assembly code or other compiled code. The server 204 may be coupled to a database 210 which may be any type of database or file system capable of storing a schema, such as a XML schema, an object model or other storage organization. The server 204 may include a database manager 218 for handling communication and data exchange with the database 210. Stored within the database 210 may be a dictionary 216 derived from scanning a build 212.

The scanning engine 208 may include a configuration loader 220, a dependency tracker 222, an execution monitor 224, a results manager 226, a delta generator 228, and a code generator 230. The configuration loader 220 may be used to load the default configuration information or add-in configuration information created by a user or tester. The dependency tracker 222 may discover dependencies of a type during processing of a software build. The execution monitor 224 may invoke and monitor execution of methods of a type during processing of a software build. The results manager 226 may handle comparison of results generated by builds and logging events notifying of a difference. The delta generator 228 may compute structural differences between two software builds. And the code generator 230 may produce code for specified targets from intermediate code to aid in reproducing and fixing bugs.

Figure 3:
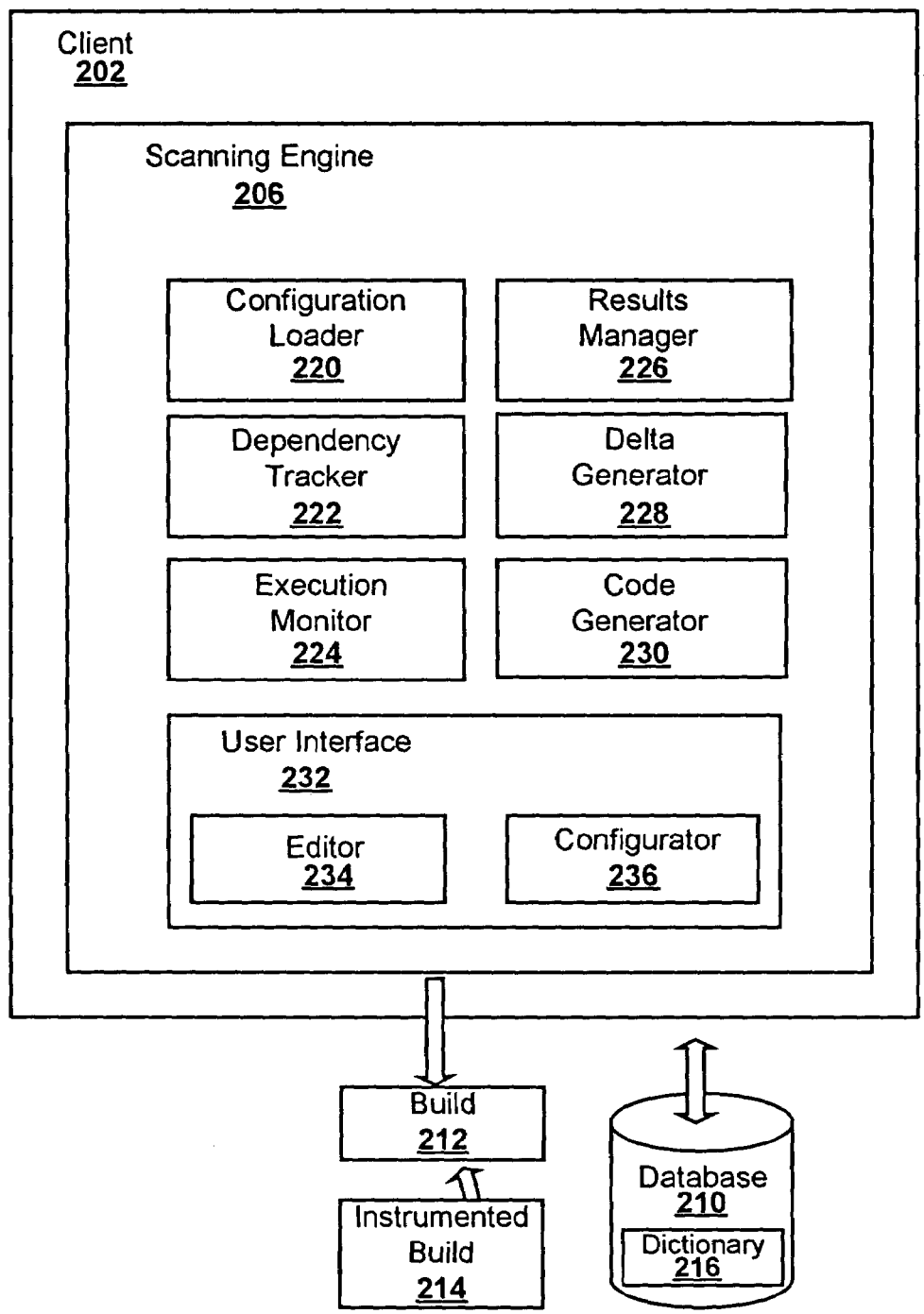
FIG. 3 is a block diagram generally representing a client architecture for offline testing of a software build, in accordance with an aspect of the present invention.

A copy of the scanning engine 206 may also be executed locally on a client 202 computer as shown in FIG. 3. In addition, the client 202 may include a graphical user interface 232 for interacting with the system. The user interface 232 may have an editor 234 and a configurator 236. The editor 234 may be used to browse and edit a view of the dictionary and the configurator 236 may be used to prepare add-in configuration information for testing binaries of a build.

FIG. 3 presents a block diagram generally representing a client architecture for offline testing of a software build. A copy of the scanning engine 206 may be loaded on the client 202 computer for execution locally. Like the shared scanning engine 208 operative on the server 204, the scanning engine 206 may include a configuration loader 220, a dependency tracker 222, an execution monitor 224, a results manager 226, a delta generator 228, and a code generator 230. In the offline mode, testers may prepare add-in configuration information to augment the default configuration information of the global dictionary 216. This augmented configuration information may be stored locally in cache and may be used to selectively test the binaries.

Those skilled in the art will appreciate that the functionality implemented within the blocks illustrated in FIG. 2 and FIG. 3 may be implemented as separate components or the functionality of several or all of the blocks may be implemented within a single component. For example, the Editor 234 may include the functionality of the Configurator 236. As another example, the Execution Monitor 224 within the Scanning Engine 206 (or the Shared Scanning Engine 208) may include the functionality of the Results Manager 226.

Figure 4:
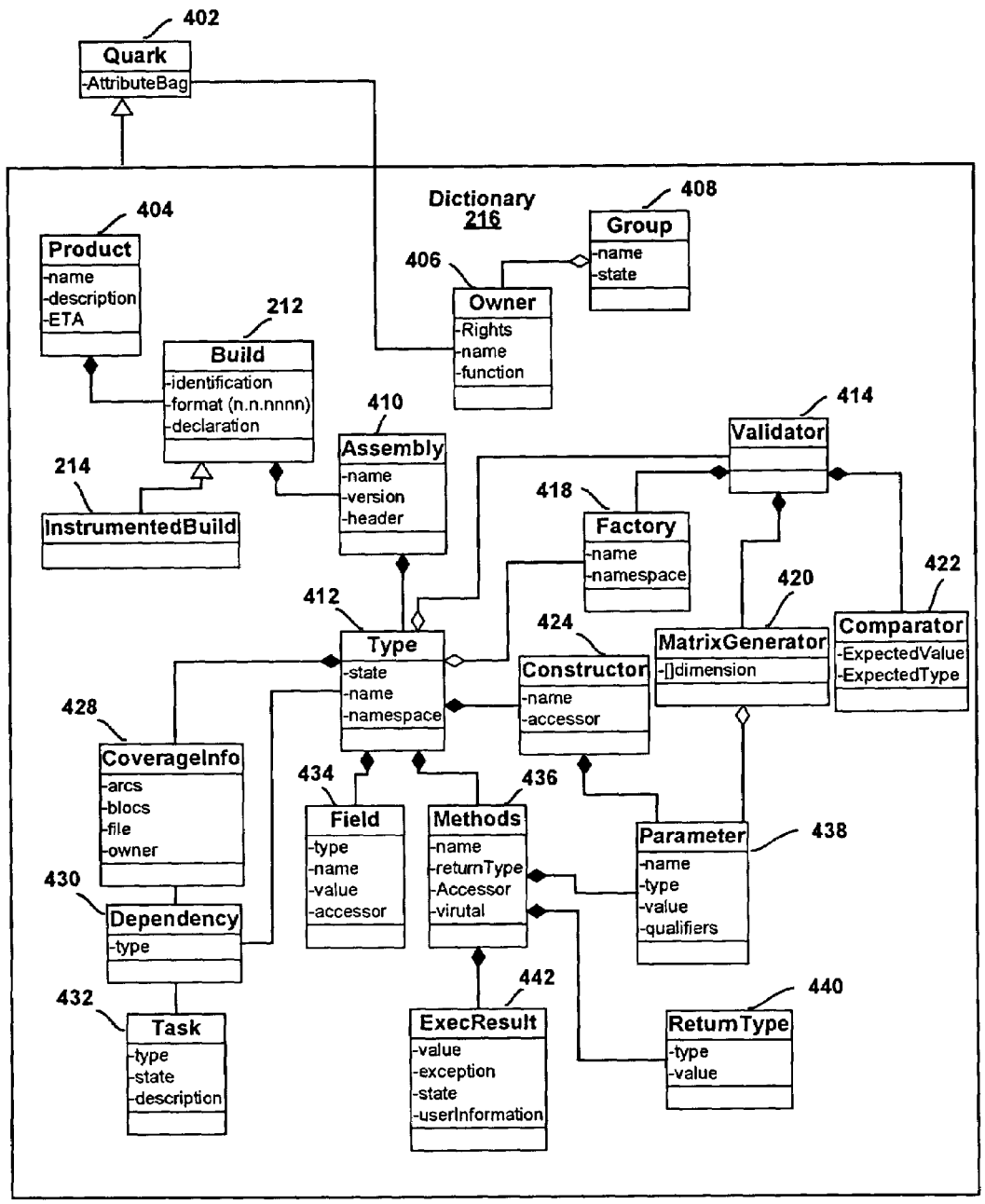
FIG. 4 is a general representation of a dictionary for representing each software build, in accordance with an aspect of the present invention.

FIG. 4 presents a general representation of a dictionary 216. The dictionary 216 may be built the first time that the scanning engine scans a build 212 of a product 404. The dictionary may be built as a tree with information about a product 404 stored as the root node. This information may include a name, a description, and other information related to the product. Each product may have information about a build 212 stored as a child node. This information may include a unique identifier, a declaration and other information related to the build. Each build node may have children that store information about an instrumented build 214 and/or information about an assembly 410, such as a name, a version or other information related to the assembly. Each assembly 410 may have information about a type 412 stored as a child node. The type information may include a class name, namespace and other information about the type.

A type 412 may have many children for storing information about a field 434, a method 436, a constructor 424, a validator 414, a factory 418, coverage information 428, dependency information 430, and task information 432. A method 436 may have children for storing information about a parameter 438, a return type 440, and an execution result 442.

A validator 414 may have children for storing information about a factory 418, a matrix generator 420, and a comparator 422. A validator may attach a validation pattern to a specific type in order to validate the type. A validator may contain a factory that you use to create types that you may pass as parameters. It may also contain a matrix generator to provide different combinations of parameter values for input as test vectors. A validator may also contain a comparator that may be used to verify that the actual output is the expected output.

Security and access permission may be provided for the dictionary. A quark 402 node may provide access control information such as a binary access mask used to derive read, write and execute permission. A quark 402 may have information about an owner 406 stored as a child node. The information may include rights, a name and other information about the owner. An owner may in turn have information about a group 408 stored as a child node. The access permissions may support full access to the owner, read and execute access only to the group, and read access only to others.

Figure 5:
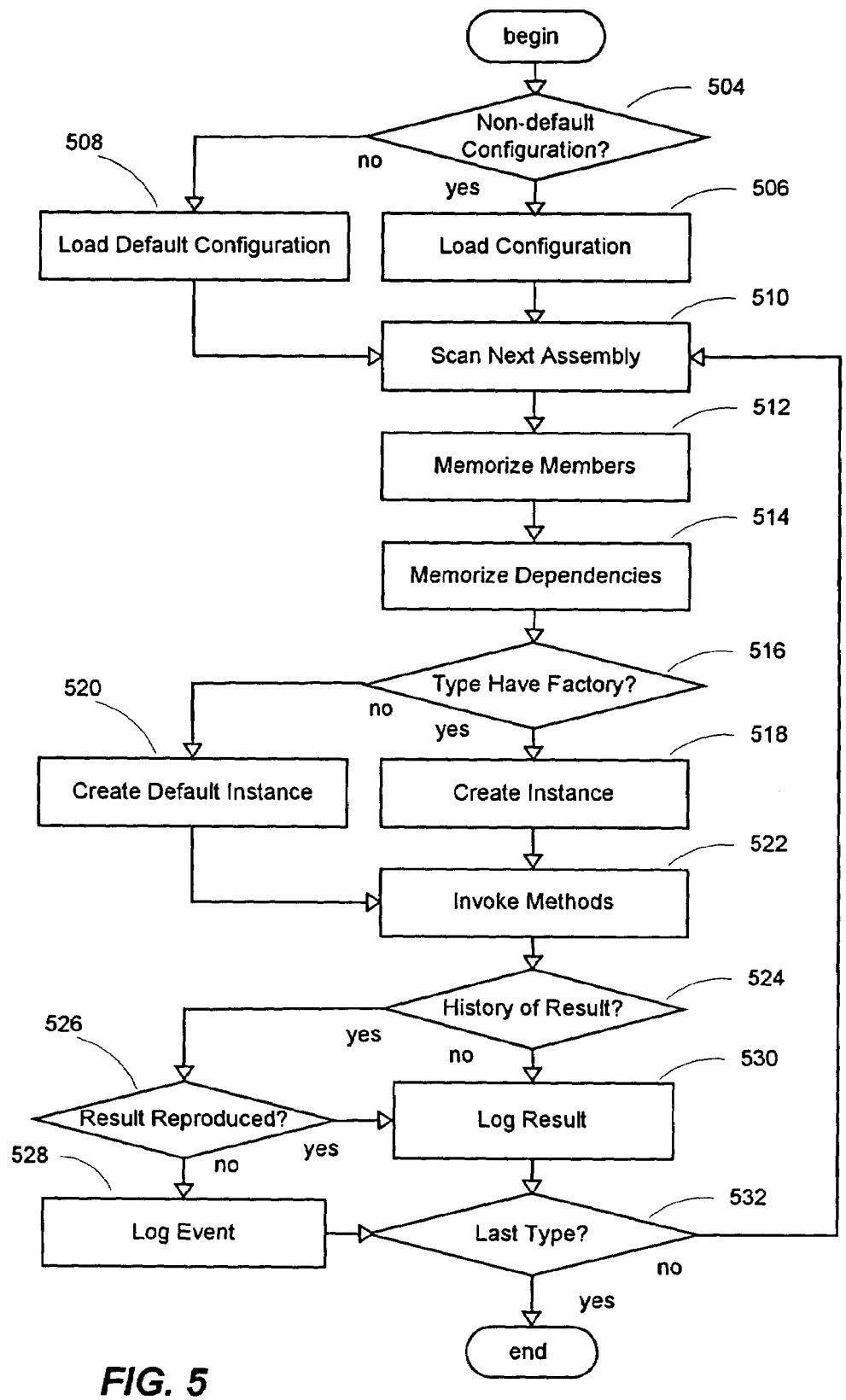
FIG. 5 is a flowchart generally representing the steps undertaken by the system for processing a software build, in accordance with an aspect of the present invention.

FIG. 5 presents a flowchart generally representing example steps undertaken by the system for processing a software build. First, the system may check at step 504 if there is a configuration file containing additional information for configuration of the product. If there is not, then the system may load the default configuration information for the product at step 508. However, if there is a configuration file that contains additional information, then the system may load this configuration information at step 506.

Once the configuration information has been loaded, the system is ready to begin scanning assemblies contained within the build to identify types. At step 510, the system may scan an assembly to identify a type. Then any members of the type may be identified and stored at step 512. Any dependencies on the type may be identified and stored at step 514. The type identified at step 510 may then be checked at step 516 to see if there is a factory defined for that type. If there is not, the system may create a default instance of that type from the type definition at step 520. Otherwise, the system may create an instance of the type defined by the factory at step 518.

After creating an instance of the type, the system may invoke any methods defined for that type at step 522. For each method invoked, the system may check to see if there is any history of a previous result stored from an earlier invocation of the method at step 524. If there is not, the system may log the result at step 530. However, if there is a previous result stored, then the system may check at step 526 whether the previous result stored was reproduced by invocation of the method at step 522. If it was not, then an event may be logged at step 528 so that an inquiry may be made by a user of the system to discover whether the result was intended or was an error. Otherwise, the system may log the result at step 530.

After the event is logged at step 528 or the result is logged at step 530, then the system may check whether the type scanned is the last type in the assemblies. If there is another type, then the system may scan the next type at step 510 and processing may continue. If it was the last type, then processing is finished.

Figure 6:
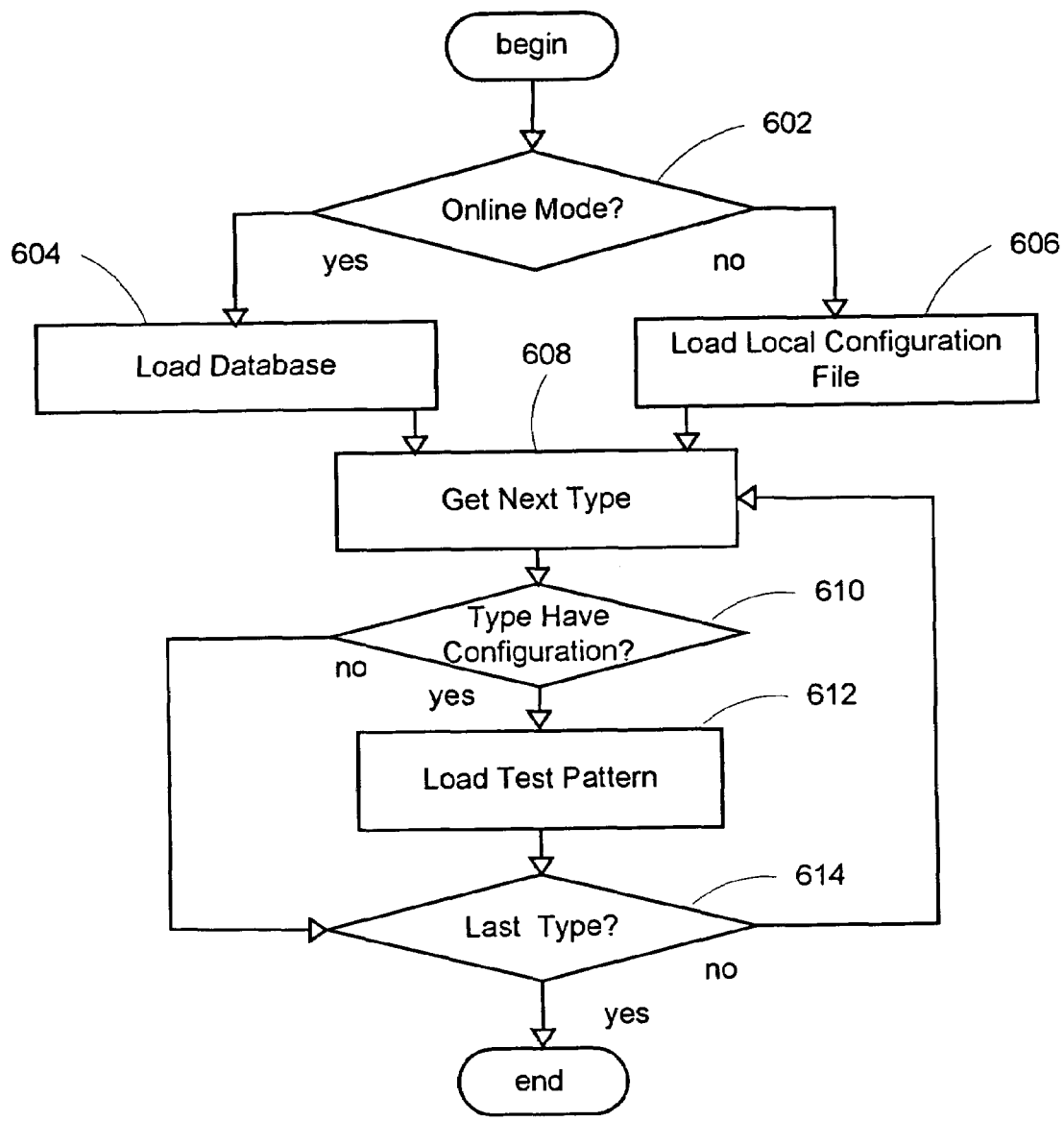
FIG. 6 is a flowchart generally representing the steps undertaken by the system for loading configuration information in processing a software build, in accordance with an aspect of the present invention.

FIG. 6 presents a flowchart generally representing the steps undertaken by the system at step 506 for loading configuration information during processing of a software build. First, the system checks at step 602 if the client machine is in online mode by verifying that it has a connection to server 204. If it is in online mode, then the client 202 may load the database of configuration information from the server. The configuration information from the last scan of the build may be used if the build was previously scanned. Note that for the initial scan of a product, there may not be configuration information available in the database. If the client machine is instead in the offline mode, then the system locates the last known local configuration file, if available, that is stored on the client machine at step 606. The local configuration file may contain configuration information in an XML schema or other type of schema. In this case, the file may be parsed in preparation for loading the configuration information. In one embodiment, the local configuration file may contain general rules for applying configuration information for types in the build. In another embodiment, filters may be included in the local configuration file for selectively applying configuration information to particular types of interest. At step 608 the system may get the first type from the loaded database or the local configuration file and may verify at step 610 that the type has configuration information to be loaded. In an embodiment where the configuration information includes filters or rules, there may be instructions to skip loading configuration information for some types. If there is configuration information to be loaded, then the system may load the configuration information at step 612. The configuration information loaded may be generally a test pattern such as a parameter matrix, execution information such as setting the mode to execution, and validation information such as a validator. Once the configuration information is loaded at step 612 or if there is no configuration information to be loaded at step 610, the system may then check at step 614 if the type processed was the last type in the loaded database or local configuration file. If it was the last type in the loaded database or local configuration file, then processing is finished. If it was not the last type in the loaded database or local configuration file, the system may get the next type at step 608 and processing may continue until the last type is processed.

Figure 7:
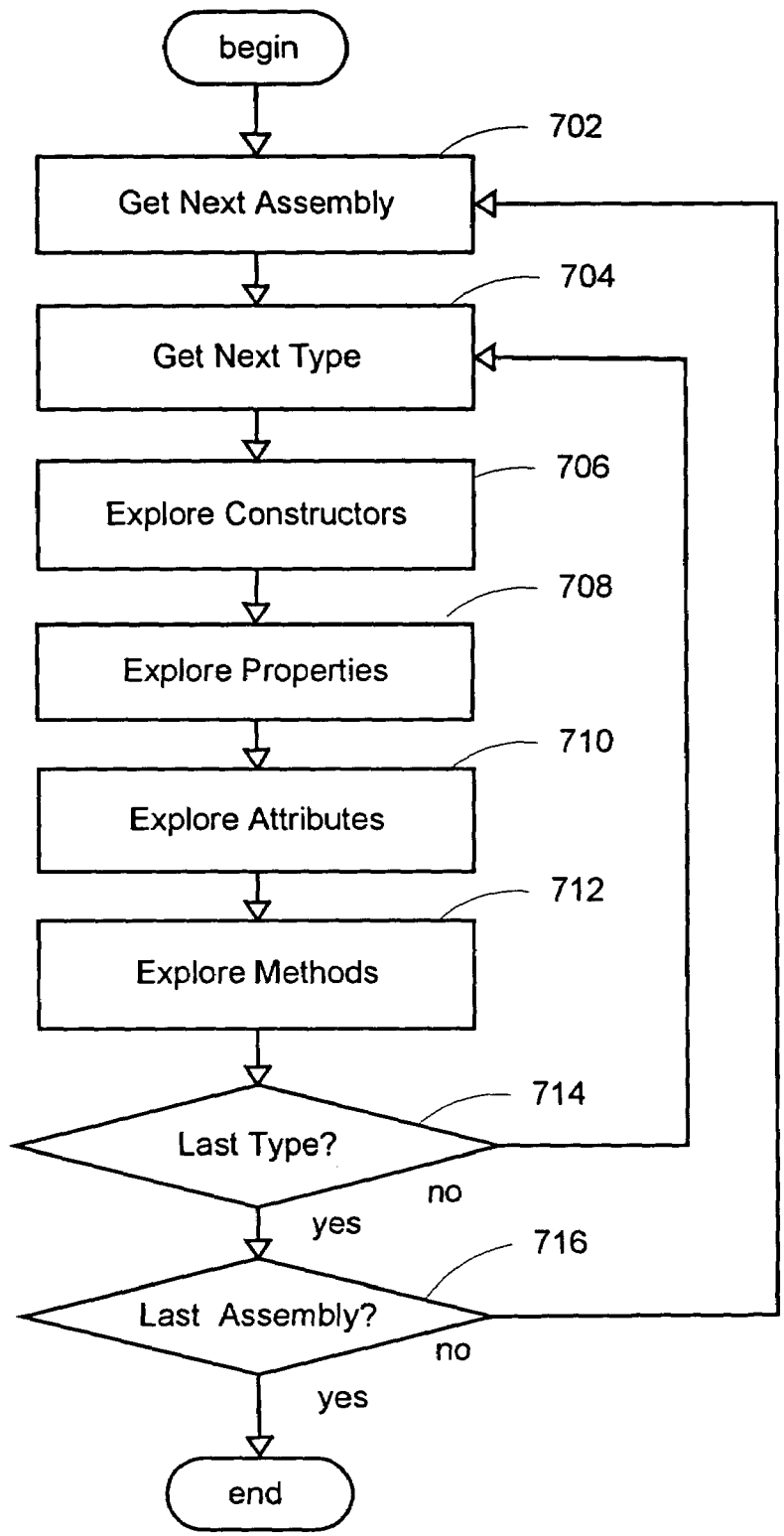
FIG. 7 is a flowchart generally representing the steps undertaken by the system for scanning types of assemblies in processing a software build, in accordance with an aspect of the present invention.

FIG. 7 presents a flowchart generally representing the steps undertaken by the system for scanning types of assemblies during processing of a software build. First, the system may get the first assembly in the build at step 702. Next the system may get the first type in the assembly at step 704. It may then explore the type to see if there are any constructors for that type at step 706. If there is a constructor, it may be placed in a temporary structure in preparation for storing in the dictionary. It may then explore the type to see if there are any properties for that type at step 708. If there are any properties, they may be placed in a temporary structure in preparation for storing in the dictionary. It then may explore the type to see if there are any attributes for that type at step 710. If there are any attributes, they may be placed in a temporary structure in preparation for storing in the dictionary. It then may explore the type to find any methods for that type at step 712. If there is a method, it may be placed in a temporary structure in preparation for storing in the dictionary.

The system may then check at step 714 if that was the last type in the assembly. If it was not the last type, then the system may get the next type at step 704 and processing may continue. If it was the last type in the assembly, then the system may check whether this was the last assembly in the build at step 716. If it was not the last assembly, the system may get the next assembly at step 702 and processing may continue until the last assembly may be processed. Otherwise, the system is finished processing.

Figure 8:
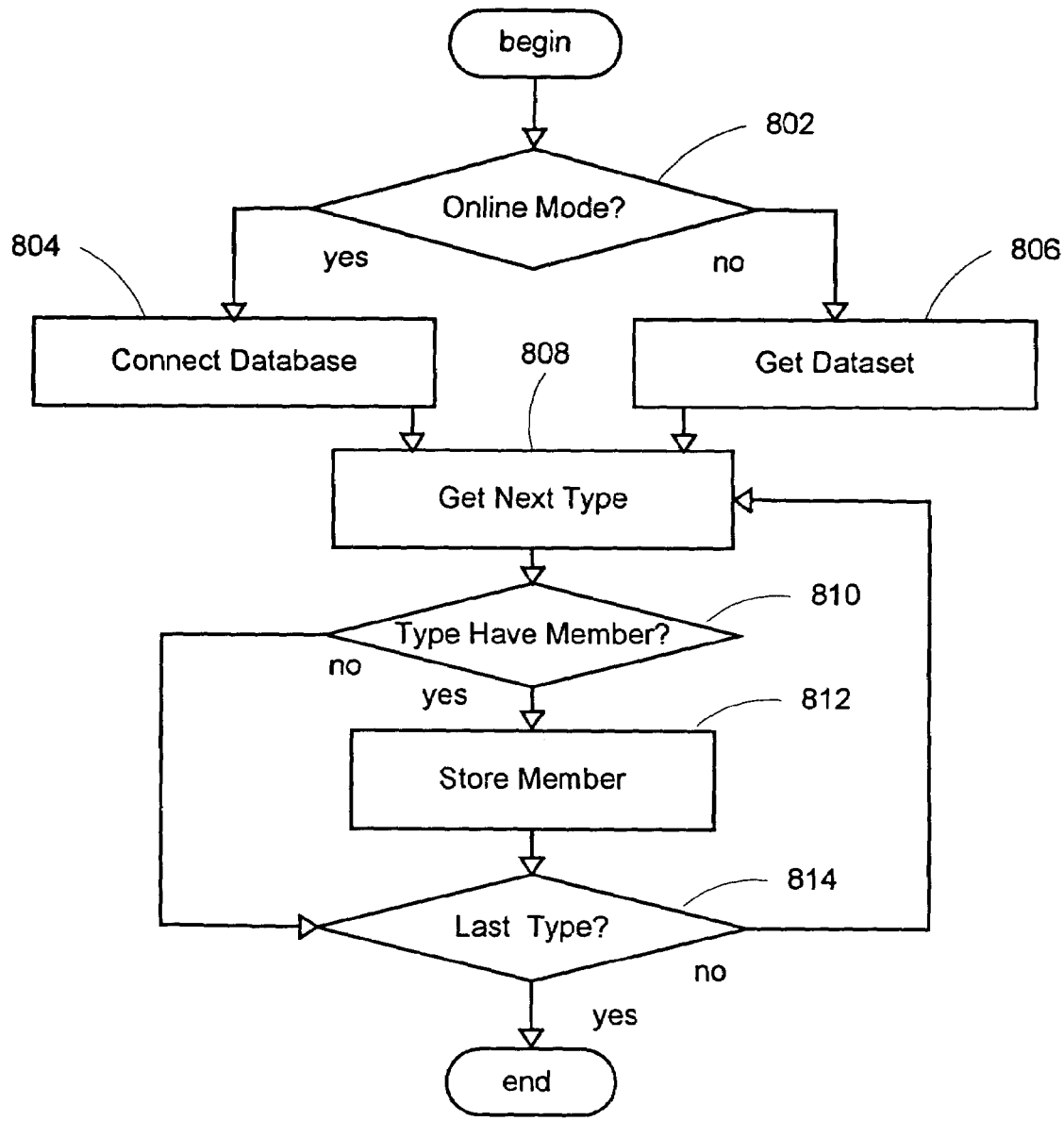
FIG. 8 is a flowchart generally representing the steps undertaken by the system for memorizing a member of a type in processing a software build, in accordance with an aspect of the present invention.

FIG. 8 presents a flowchart generally representing the steps undertaken by the system for memorizing a member of a type during processing of a software build. First, the system may check at step 802 if the client machine is in online mode by verifying that it has a connection to server 204. If it is in online mode, then the client may establish a connection to the database at step 804 for storing information in the dictionary. If, instead, the client machine is in the offline mode, then the system may open a local file for storing the dataset on the client machine at step 806. The local file may store the dataset in an XML schema or other type of schema. At step 808 the system may get the first type that was stored in the temporary structure during scanning of the assemblies. The system may check at step 810 if it has either a data member such as a field or a function member such as a method. If the type has a member, then the system may store the member at step 812 either in the dictionary on the remote database if online or in the local file if offline.

Once the member information is stored at step 812 or if the type does not have member information to be stored at step 812, the system may then check at step 814 if the type processed was the last type in the temporary structure. If it was the last type in the temporary structure, then processing is finished. If it was not the last type in the temporary structure, then the system may get the next type at step 808 and processing may continue until the last type is processed.

Figure 9:
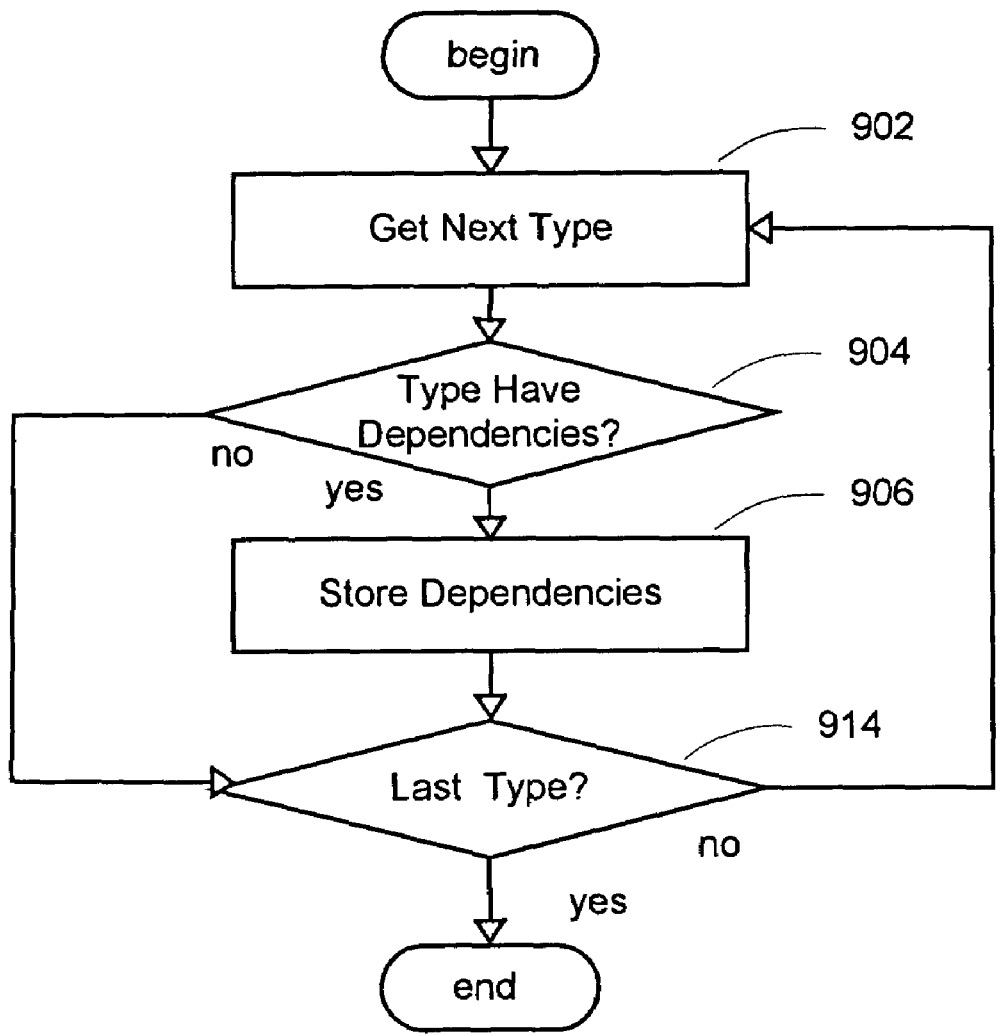
FIG. 9 is a flowchart generally representing the steps undertaken by the system for memorizing dependencies of a type in processing a software build, in accordance with an aspect of the present invention.

FIG. 9 presents a flowchart generally representing the steps undertaken by the system for memorizing dependencies of a type during processing of a software build. At step 902, the system may get a type from the dictionary, or the local file if offline, and then may check the method and parameters of that type for any method referenced to determine if there are any dependencies at step 904. For example, if a parameter is a type of string, then that parameter is dependent upon a string method which is usually provided in a library. As another example, if a method of a type invokes another method, then that type is dependent upon the type of the invoked method. For each such dependency determined at step 904, the dependency is stored in the dependency node for that type in the dictionary or the local file at step 906.

Once the dependency information is stored at step 906 or if the type does not have dependencies, the system may then check at step 908 if the type processed was the last type in the dictionary, or local file if offline. If it was the last type, then processing is finished. If it was not the last type, then the system may get the next type at step 902 and processing may continue until the last type is processed. In one embodiment, the system may continue to determine and record dependencies among products by storing dependency information for each type that has a dependency upon a type defined in another product.

Figure 10:
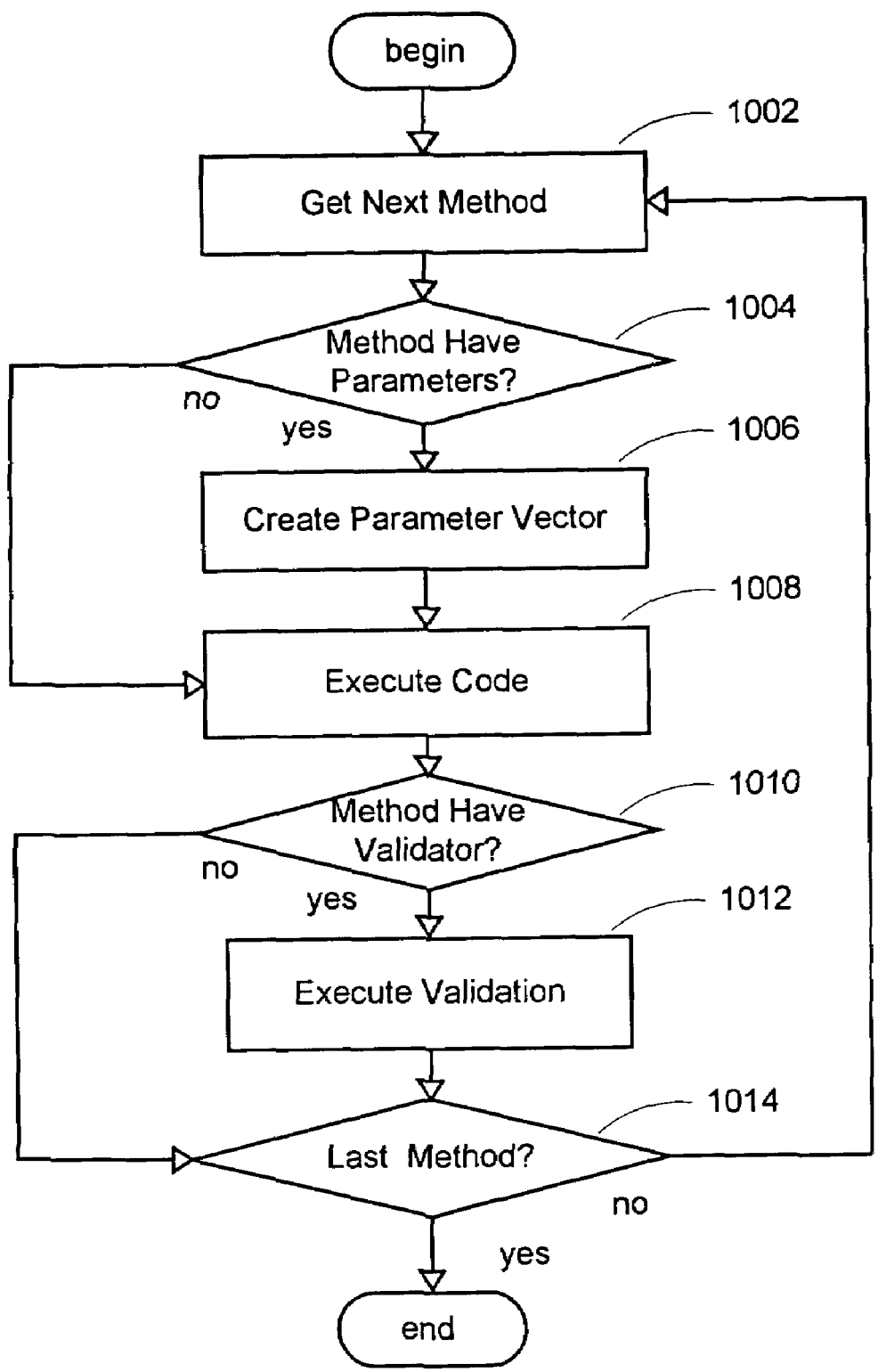
FIG. 10 is a flowchart generally representing the steps undertaken by the system for invoking methods of a type in processing a software build, in accordance with an aspect of the present invention.

FIG. 10 presents a flowchart generally representing the steps undertaken by the system for invoking methods of a type during processing of a software build. At step 1002, the system may get a method from the dictionary, or the local file if offline, and then may check whether the method has any parameters at step 1004. If the method has any parameters, then the system may create a parameter vector based on the configuration. At step 1008, the system may execute the code and store the execution result in the dictionary, or the local file if offline. The system may then determine at step 1010 whether the method has a validator which may be used to confirm the execution result. If there is a validator for that method, the system may execute validation at step 1012 and may then check if that was the last method for the type at step 1014. If it was the last method, then processing is finished. If it was not the last method, then the system may get the next method at step 1002 and processing may continue until the last method is processed.

FIG. 11 presents an illustration generally representing an example of a dictionary. It may include a header 1102 that may list the date and time for a test of a particular assembly. It may also include a declaration of the assembly name 1104 such as the assembly named "TFactory.dll". It may also include a declaration of the class or type name such as "Class1" and a declaration of the namespace such as "TFactory" 1106. The dictionary may also include a declaration of a constructor 1108 with its name such as ".ctor", its access level such as 'public="True"', its class scope such as 'static="False"', its return value such as 'returns="System.Void"' and its parameters such as 'param=""'. It also may include a parameter value 1110 along with the return value 1112 for that parameter value. The dictionary may also include a declaration of a method 1114 with its name such as "getInstance", its access level such as 'public="True"', its class scope such as 'static="True"', its return value such as 'returns="System.Object"' and its parameters such as 'param="System.String Type"'. It also may include a parameter value 1116 along with the return value 1118 for that parameter value. For example, the method may be invoked using parameter value "System.String 'null'" 1116 and have an expected return value of "null" 1118. If the return value is something else, then there may be a potential defect. Additional pairs of parameter value and return value, such as parameter value 1120 and return value 1122, may be included by adding configuration information.

FIG. 12 presents an illustration generally representing an example of a result after invoking a method of a type in the dictionary. It may include a header 1202 that may list the date and time for a test of a particular assembly. It may also include a declaration of the assembly name 1204 such as the assembly named "TFactory.dll". It may also include a declaration of the class or type name 1206 such as "Class1" and a declaration of the namespace such as "TFactory". The dictionary may also include a declaration of a constructor 1208 with its name such as ".ctor", its access level such as 'public="True"', its class scope such as 'static="False"'. It may also include its parameter value 1210 and its return value 1212. The dictionary may also include a declaration of a method 1208 with its name such as "dosomething1", its access level such as 'public="True"', its class scope such as 'static="False"', and its return value such as 'returns="System.Void"', and parameter value such as 'param=""'. It may also include its parameter values 1210 and its return value 1212. The example of what is shown in FIG. 12 in an XML format may be representative of what is stored in the object model of the database.

Figure 13:
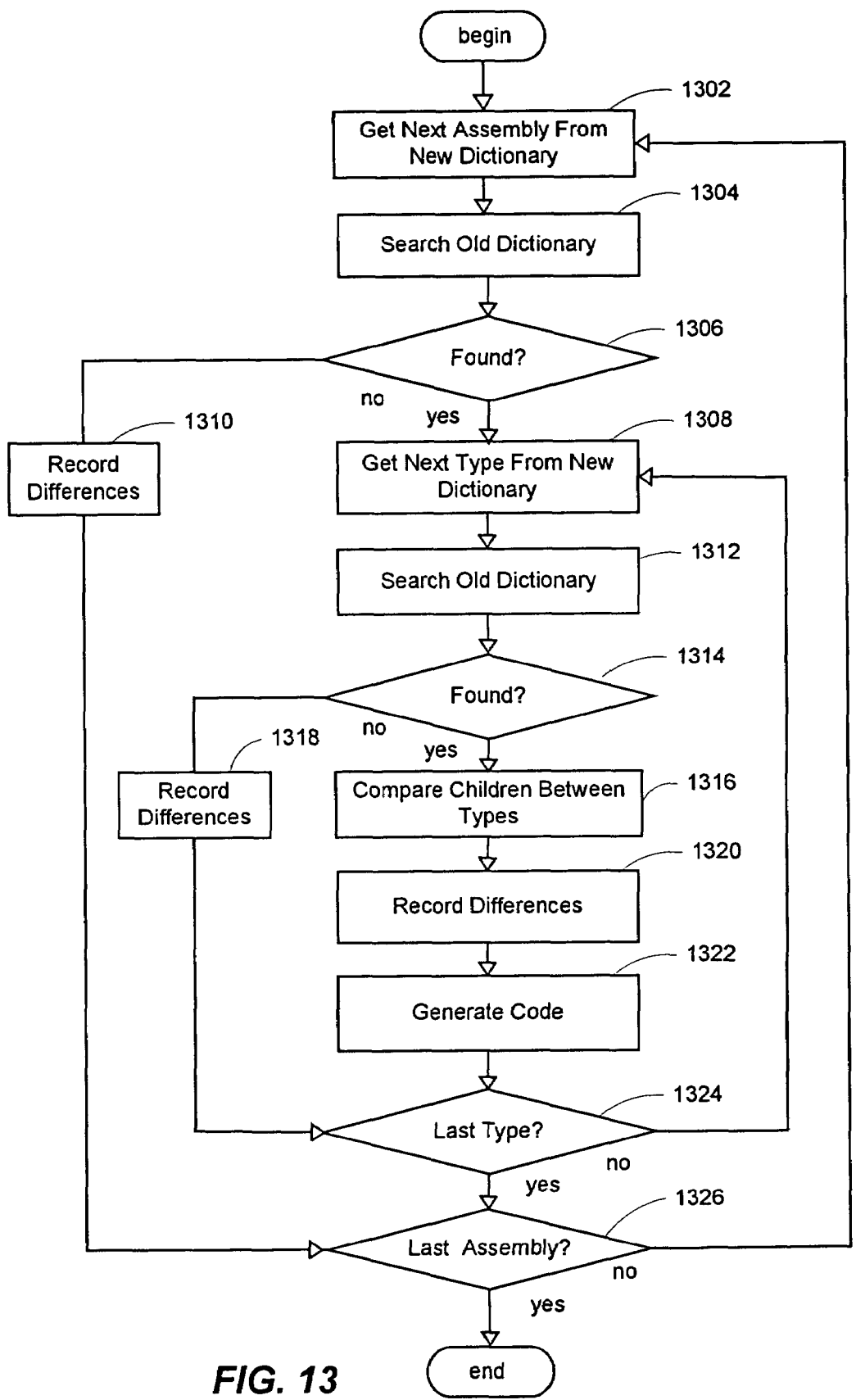
FIG. 13 is a flowchart generally representing the steps undertaken by the system for computing a delta between two software builds, in accordance with an aspect of the present invention.

FIG. 13 presents a flowchart generally representing the steps undertaken by the system for computing a difference between two software builds. At step 1302, the system may select an assembly from a new dictionary, or the local file if offline, and then the system may search an old dictionary that is being compared with the new dictionary for that same assembly at step 1304. If the assembly is found in the old dictionary at step 1306, then the system may select a type of the assembly from the new dictionary at step 1308 and may search the assembly of the old dictionary for that same type at step 1312. If the type is found in the old dictionary at step 1314, then the children of the type in the new dictionary may be compared with the children of the type found in the old dictionary at step 1316. Any differences detected may be recorded at step 1320. Where the results stored for a type are different between the new build and the old build, the system may determine what code produced the different results and then may generate code at step 1322. The code may be generated from intermediate code to specified targets to aid developers in debugging the code. In one embodiment the differences may be recorded by listing the dictionary entry with the prefix <OLD> if deleted from the new dictionary and listing the dictionary entry with the prefix <NEW> if added to the new dictionary.

If the type is not found in the old dictionary at step 1314, then the system may record the difference at step 1318. After recording any difference, the system may check if this is the last type in the new dictionary at step 1324. If this is the last type, then the system may check if this is the last assembly at step 1326. Otherwise, the system may select the next type at step 1308 and processing may continue.

Returning to step 1306, if the assembly is not found at step 1306, then the system may record the difference (that the assembly was added to the new dictionary) at step 1310. In one embodiment, any element in the old dictionary that is not included in the new dictionary may also be recorded as a difference (in this case, that the assembly was deleted in the new dictionary). After recording any difference, the system may check if this is the last assembly in the new dictionary at step 1326. If this is not the last assembly, then the system may select the next assembly at step 1302 and processing may continue until the last assembly is processed.

Although FIG. 13 was described using an example of comparing a new dictionary to an old dictionary, those skilled in the art will appreciate that any two builds may be compared. For example an old build may also be compared to a new build, two old builds may be compared, or a single element including its children may be selectively compared between two builds. As will be appreciated by those skilled in the art, the search for finding an assembly, type or other element in a dictionary may advantageously include searching for an equivalence class of that element to discover any name changes that may have occurred between builds.

Figure 14:
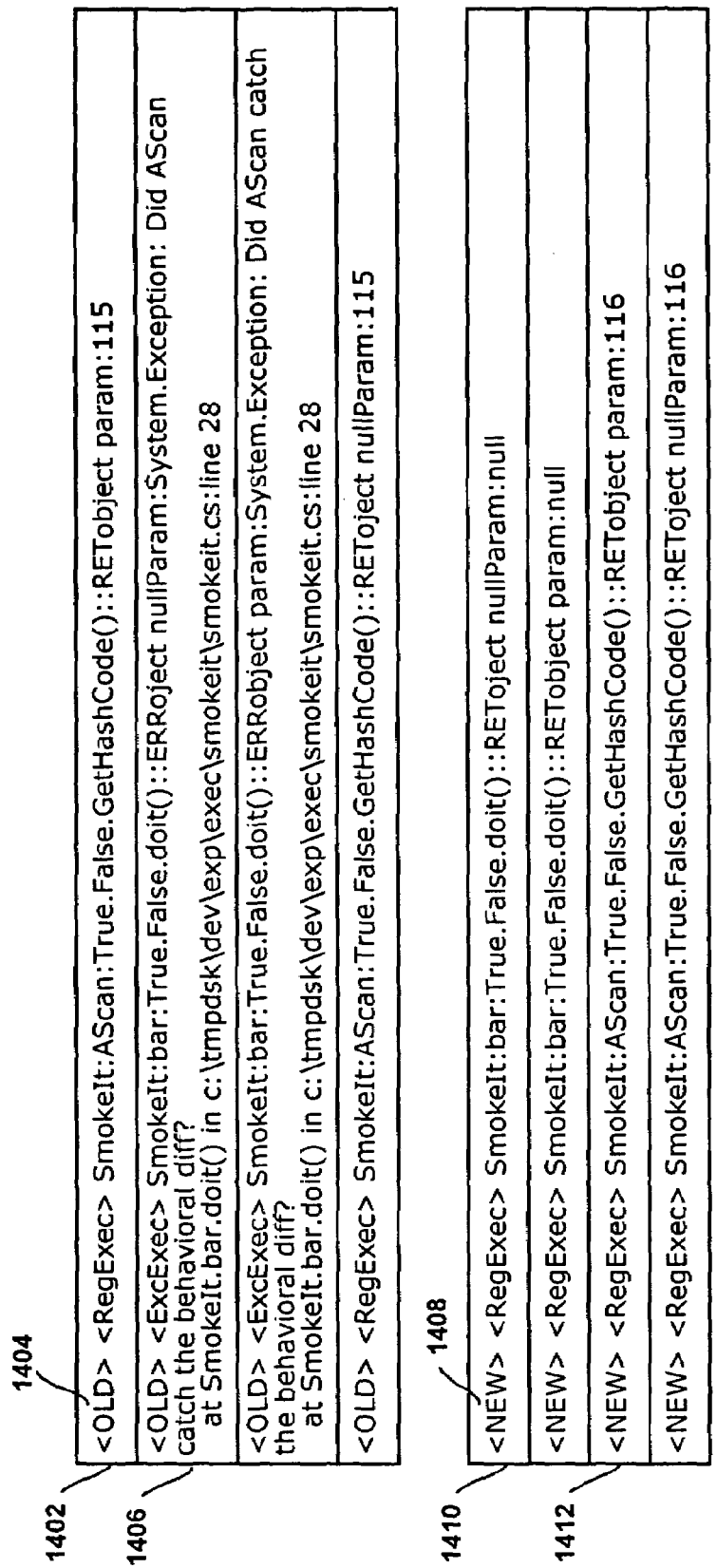
FIG. 14 is an illustration generally representing an example of a delta computed between two software builds, in accordance with an aspect of the present invention.

FIG. 14 presents an illustration generally representing an example of a delta computed between two software builds. The differences discovered by a comparison between a new dictionary and an old dictionary may be recorded by listing the dictionary entry with the prefix <OLD> if deleted from the new dictionary and listing the dictionary entry with the prefix <NEW> if added to the new dictionary as shown in FIG. 14. For example, dictionary entry 1402 has the prefix <OLD> 1404 and indicates an entry that has been deleted from the new dictionary. Likewise, dictionary entry 1412 has the prefix <NEW> and indicates an entry that has been added to the new dictionary.

Note that FIG. 14 shows an example of finding a behavioral difference between invoking the methods of two builds. The prior version of the method doit( ) previously threw an exception for the value of the ERRobject as shown in dictionary entry 1406. In the new version, there has been a behavioral change. The exception no longer occurs and the method doit( ) returns null as shown in dictionary entry 1410.

Figure 15:
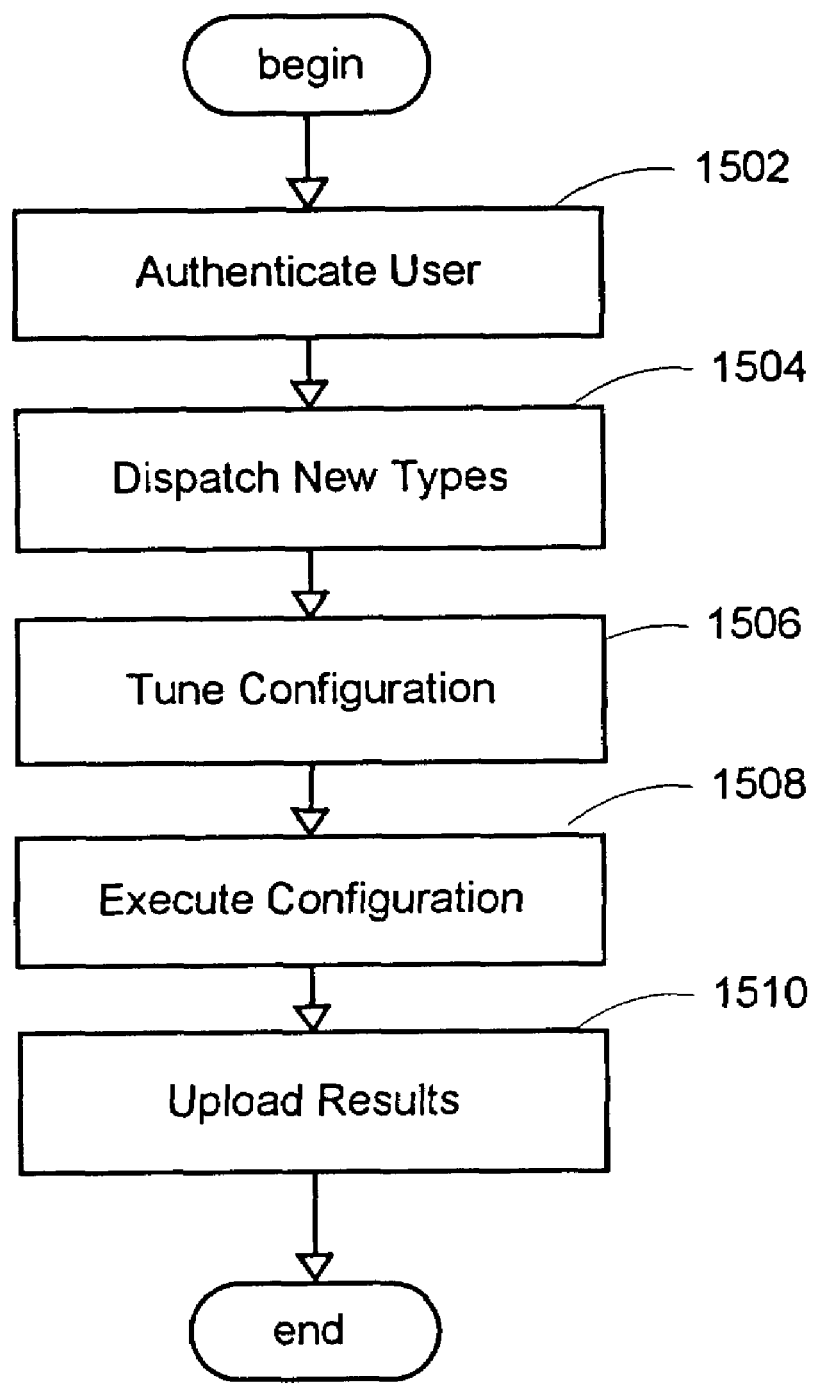
FIG. 15 is a flowchart generally representing the steps undertaken by a user of the system for adding configuration information to the system and using the added configuration information to test a software build, in accordance with an aspect of the present invention.

FIG. 15 presents a flowchart generally representing the steps undertaken by a user of the system for adding configuration information to the system and using the added configuration information to test a software build. First a user may be authenticated at step 1502 for access permission to read, write or execute any individual type. A user of the system may dispatch new types at step 1504 for other users to have access permission such as read permission to explore delta information, write permission to tune the configuration for their types locally, or execute permission to run the configuration to produce results. A user may tune the configuration for their types locally at step 1506 by adding in an article of configuration which may include a factory, a vector of parameters, a comparator or a validator. The article of configuration is a validation pattern that may be used to expand test coverage of a type. The validation pattern may include a validator for dynamically implementing testing of the type, a factory for creating types that may be passed as parameters, a matrix generator for providing different combinations of parameter values for input as test vectors, and a comparator for verifying that the actual output is the expected output. A user may selectively execute types of the build using the tuned or default configuration at step 1508. Finally, a user may upload results to the dictionary at step 1510.

FIG. 16 presents an illustration generally representing an example code coverage report. Code coverage may be a good metric or indicator to use in evaluating stability of a product. Thus, the code coverage report may be used to drive future testing work and target areas of the code for additional testing. The report may include a section summarizing the code coverage for all components selected for testing such as section 1604 and may include a section for a specific component tested such as section 1618. There may be a name for the component(s) tested such as "All Components" 1606, a column for blocks 1608, a column for arcs 1610, a column for functions 1612, a column for source files 1614 and a column for classes 1616. The report 1602 indicates the total number for each column, the number hit by the system in testing for each column, and the percentage hit in testing for each column. A block means a section of code that is executable and an arc means a branch or jump from one block to another.

Some arcs may be difficult to test since the code does not branch from a block except for rare conditions. For example, a conditional branch may only occur upon incrementing a counter to one million and each increment of the counter occurs every hour. One way the system may make the branch occur is through fault injection. The report 1604 indicates that 91% of the classes were tested with 45% of the blocks tested and 37% of arcs tested. The invention may test a build and achieve such results with a direct scan using the default configuration. The coverage may be increased by manually adding a set of constructors to specific types so that meaningful instances of the class may be created during invocation of the methods.

Figure 17:
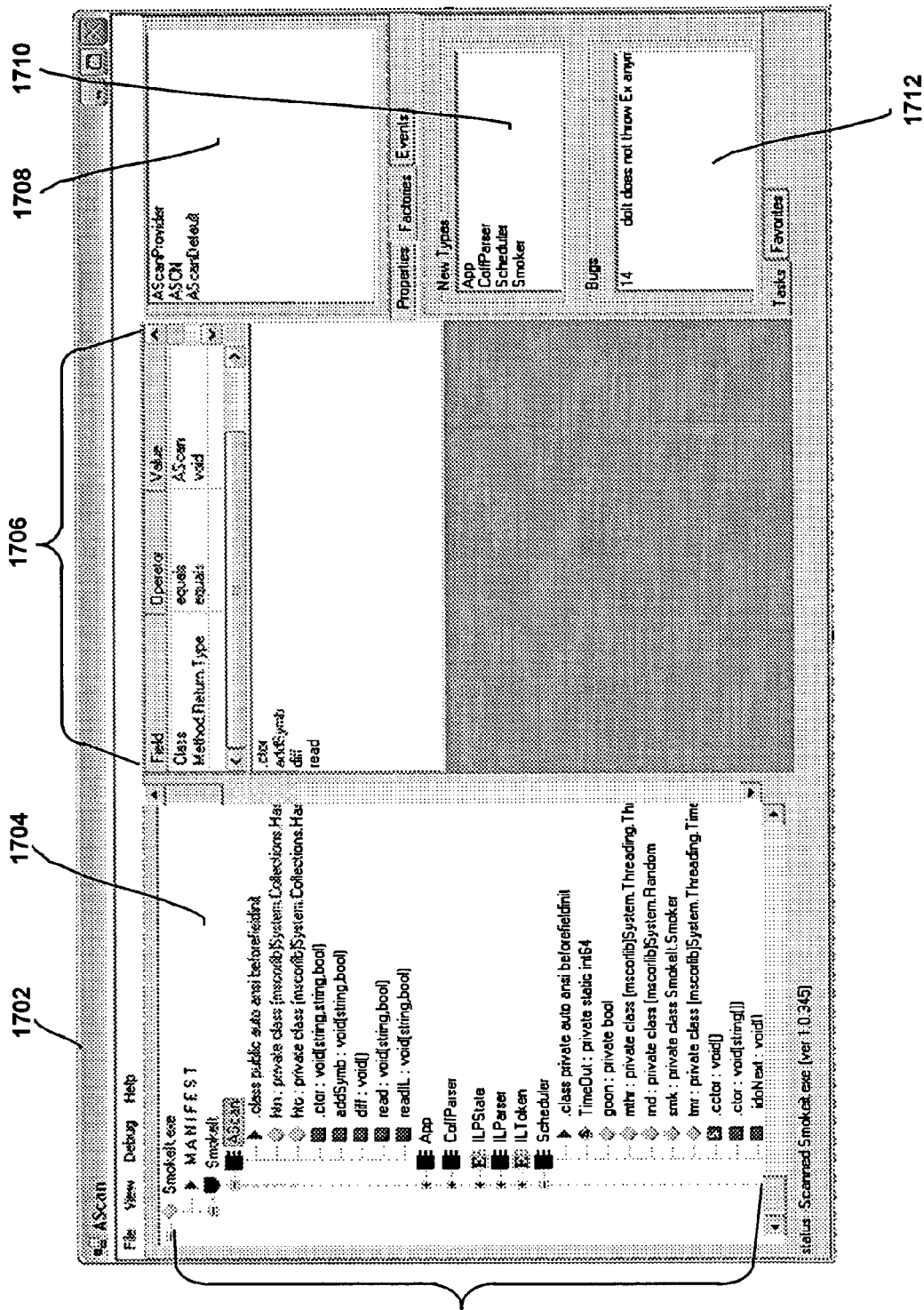
FIG. 17 is an illustration generally representing an example user interface for reporting the status of a software build after processing by the system, in accordance with an aspect of the present invention.

FIG. 17 presents an illustration generally representing an example graphical user interface for reporting the status of a software build after processing by the system. The graphical user interface 1702 may include a dictionary display area 1704, a query builder, 1706, an area for displaying attributes 1708, an area for displaying new types 1710 and an area for displaying bugs 1712.

The dictionary display area 1704 may include a tree-type viewer 1714 for browsing a representation of the dictionary. Every single entity in the dictionary may be associated with an icon and the state of any specific type may be reviewed, for instance, to see if it has been modified. Selecting an object may create a query on the object. The query builder 1706 may be used to expand the default query created by selecting an object in the tree-type viewer 1714. Clauses may be built by the query builder for metadata of the dictionary presented in the tree-type viewer 1714.

The area for displaying attributes 1708 may show specific attributes that may be attached to a type such as properties, factories, and events. New types created in this build within the scope of the query may be listed in the area for displaying new types 1710. And any bugs or behavioral differences discovered within the scope of the query may be listed in the area for displaying bugs 1712.

This graphical user interface 1702 may be used by testers to create and load a set of constructors for any specific types to further increase coverage of types (or classes) tested. Typically, 80% of code coverage is very good and rarely achieved for a large code base. Often there is a disproportionate amount of work by teams of testers to achieve incremental percentage in code coverage beyond 60% without this system. Those skilled in the art will appreciate that with this system and method, 80% of code coverage is achievable with significantly fewer resources. The system may also provide detailed reports that may be used to drive future testing work and target specific areas of the code for additional testing. Additionally, the system may further provide code generation from intermediate code to specified targets to aid in reproducing and fixing bugs.

As can be seen from the foregoing detailed description, there is provided a system and method for improved testing of a software build. The system and method may scan the binaries of a build to automatically discover its classes, build a detailed dictionary that captures static and dynamic information of that build, and automatically track differences between that software build and another. A comparison may be made with the other build, so that the present invention may automatically execute selective tests on any types, and their dependencies, that have had a structural or behavioral modification. The system and method thus provide significant advantages and benefits needed in contemporary software development and testing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system, a method of tracking differences between software builds of a software product, the method comprising:

scanning a first binary software build of a software product to automatically discover classes in the first binary software build, wherein the first binary build comprises a first set of binary files compiled from source code of the software product;

discovering dependencies of the discovered classes;

storing a first dictionary data structure including the discovered classes with their corresponding discovered dependencies;

comparing the first dictionary data structure with a second dictionary data structure, the second dictionary data structure including classes organized with their dependencies of a second binary software build, wherein the second binary build comprises a second set of binary files compiled from source code of the software product by comparing classes and dependencies set forth in the first and second dictionary data structures; and based on the comparison of the first dictionary data structure with the second dictionary data structure, providing an indication of differences between the first and second binary software builds including:

determining what code segment produced the differences between the first and second binary software builds; and then generating code, from intermediate code, that specified the differences between the first and second binary software builds, and displaying the code segment that produced the differences between the first and second binary software builds.

2. The method of claim 1, wherein discovering classes comprises:

(a) loading configuration information for the first binary software build;

(b) identifying a class of the first software build;

(c) creating an instance of the identified class; and (d) repeating acts (b) and (c) for other classes in the first binary software build.

3. The method of claim 2, wherein loading configuration information for the first binary software build comprises loading default configuration information.

4. The method of claim 2, wherein loading configuration information for the first binary software build comprises loading additional configuration information.

5. The method of claim 2, wherein creating an instance of the identified class comprises checking to see if a factory is defined for the class.

6. The method of claim 1, wherein discovering dependencies of the discovered classes comprises exploring the class to determine if there are any constructors, properties, attributes or methods for the class.

7. The method of claim 6, wherein if there are any constructors, properties, attributes or methods for the class, storing the constructors, properties, attributes or methods for the class in a temporary structure in preparation for storing in the first dictionary data structure.

8. The method of claim 1, wherein providing an indication of differences between the first and second binary software builds comprises providing a delta which indicates entries that have been added or deleted between the first dictionary data structure and the second dictionary data structure.

9. The method of claim 1, further comprising displaying a tree representation of the dictionary data structure that can be used to determine if any classes have been modified.

10. The method of claim 1, further comprising receiving user input for loading constructors to specific classes for increasing code coverage testing for changes between the first software build and the second software build.

11. A storage computer readable medium comprising computer executable instructions for performing the acts of claim 1.

* * * * *